F. W. MILBY.
Animal-Trap.

No. 216,287.  Patented June 10, 1879.

Witnesses  
Fred G. Dieterich  
George Binkenburg

Inventor  
Frank W. Milby  
by Louis Bagger & Co.  
his Attorneys

UNITED STATES PATENT OFFICE.

FRANK W. MILBY, OF NAVIDAD, TEXAS.

IMPROVEMENT IN ANIMAL-TRAPS.

Specification forming part of Letters Patent No. 216,287, dated June 10, 1879; application filed October 14, 1878.

*To all whom it may concern:*

Be it known that I, FRANK W. MILBY, of Navidad, in the county of Jackson and State of Texas, have invented certain new and useful Improvements in Animal-Traps; and I do hereby declare that the following is a full, clear, and exact description of the invention, which will enable others skilled in the art to which it appertains to make and use the same, reference being had to the accompanying drawings, which form a part of this specification, and in which—

Figure 1:
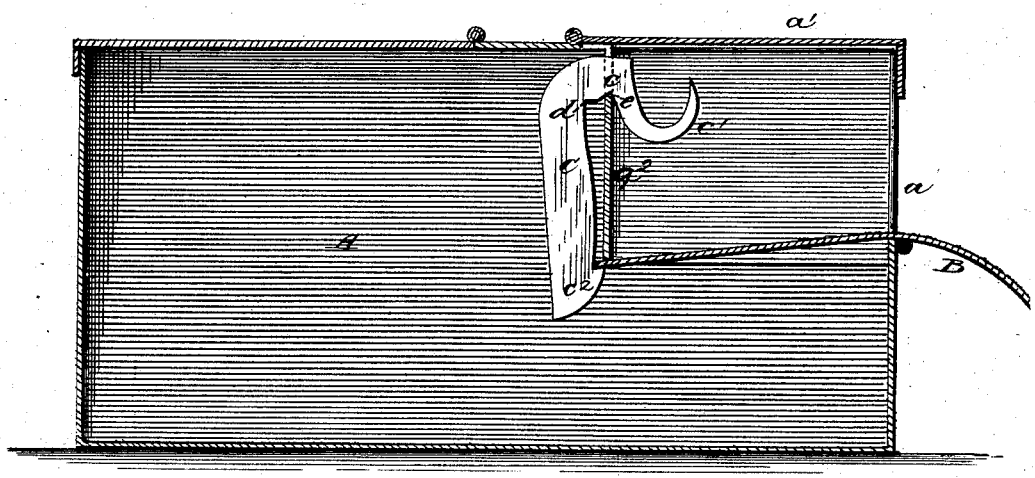
Figure 2:
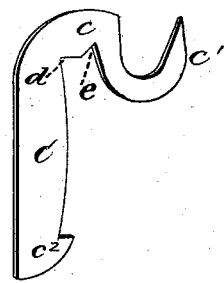

Figure 1 is a longitudinal vertical section of my improved animal-trap; and Fig. 2 is a detail view of the combined tilting platform, supporting-hook, and bait hook or trigger.

The same part in the two figures is denoted by the same letter.

This invention relates to that class of self-setting animal-traps which consists of a tilting platform in combination with a catch-lever for supporting said platform and a closed box or receptacle arranged underneath the tilting platform; and it consists in the combination of the tilting platform with a detachable lever-catch of peculiar construction, substantially as and for the purpose hereinafter more fully described.

In the drawings, A is the box or receptacle, of any usual construction, and provided with an opening, $a$, in its front end, which may be duplicated at its other end. In this opening or entrance is hung, about midway its length, the tilting platform B, the outer end of which is curved or extended downward to the ground; and it may be provided with a roughened surface to aid the mouse or rat or other animal ascending the same to enter the opening $a$ upon the inwardly-projecting portion of the platform B, which portion of the platform rests beneath a depending partition, $a^2$, to prevent that end of said platform rising when its outer end is being climbed by the animal. The opening $a$ may be closed from the top by the hinged lid $a^1$.

C is the tilting-platform support and bait hook or trigger, which is hung by its horizontal bar $c$ in an aperture in the downwardly-projecting partition or diaphragm $a^2$, with its upper hook or trigger $c^1$, upon which the bait is placed, depending in the entrance opening $a$, while the other end of its horizontal bar $c$ extends downwardly to or about in a line with the inner end of the tilting platform B, where it is provided with a second hook, $c^2$, to support the said end of platform when set.

The part $c$ of the lever catch or support C is provided with two notches, $d\ e$, in either one of which, in inserting the parts $c^1\ c$ through the vertical slot or aperture in partition $a^2$, the lever may be hung. If suspended by the notch $d$, the leverage of the parts $c^1\ c$ will be increased, so that it will require less power to operate the catch; but if hung in $e$, as in Fig. 1, it will require a greater pull upon the bait-hook to operate the trap.

Experience teaches that it is desirable to be able to adjust the trigger in a trap in a manner to correspond to the nature and strength of the class of animals for which it is to be used, and this I accomplish by the construction of the catch-lever, as herein described, which, being loosely inserted into the aperture in which it is hung, and not firmly pivoted therein, may be adjusted as desired in a moment of time. This mechanism may, of course, be duplicated in the opposite end of the box A, to constitute it a double trap.

It will be observed that as the animal, after having ascended the platform B and passed to its inner end, reaches up and pulls the bait, the lower hooked end of the lever C will be pulled from under the platform B, and the latter thus left unsupported, and, by the weight of the animal thereon, be tilted, and the animal precipitated below into the box and be entrapped. The platform will immediately reset itself for use again.

This device is exceedingly simple, cheap, easily constructed, and effective.

Having thus fully described my invention, I claim and desire to secure by Letters Patent of the United States—

In combination with the box or receptacle A, having the vertical slotted partition $a^2$ and hinged platform B, the detachable and adjustable catch-lever C, provided with the hooks $c^1\ c^2$ and notches $d\ e$, substantially as and for the purpose herein shown and described.

In testimony that I claim the foregoing as my own I have hereto affixed my signature in presence of two witnesses.

FRANK WHITSON MILBY.

Witnesses:
GEORGE MENEFEE, Jr.,
FRANCIS M. WHITE.